United States Patent [19]

Jackson

[11] Patent Number: 4,931,631

[45] Date of Patent: Jun. 5, 1990

[54] LONG RANGE, THRU-BEAM PHOTOELECTRIC ALIGNMENT INDICATOR

[75] Inventor: Robert J. Jackson, Bothell, Wash.

[73] Assignee: Opcon Incorporated, Everett, Wash.

[21] Appl. No.: 214,379

[22] Filed: Jul. 1, 1988

Related U.S. Application Data

[63] Continuation-in-part of Ser. No. 95,639, Sep. 14, 1987, abandoned.

[51] Int. Cl.$^5$ .............................................. G01V 9/04
[52] U.S. Cl. ..................................... 250/221; 340/556
[58] Field of Search ............ 250/201, 221, 239, 222.1; 340/555–557

[56] References Cited

U.S. PATENT DOCUMENTS

| | | | |
|---|---|---|---|
| 3,857,639 | 12/1974 | Mason | 250/201 |
| 4,013,886 | 3/1977 | Schmid | 250/239 |
| 4,051,365 | 9/1977 | Fukuyama et al. | 250/239 |
| 4,814,628 | 3/1989 | Eichweber | 250/221 |

Primary Examiner—David C. Nelms
Assistant Examiner—Khaled Shami
Attorney, Agent, or Firm—Christensen, O'Connor, Johnson & Kindness

[57] ABSTRACT

A photoelectric alignment indicator that includes two indicators (10) and (11) and a photoelectric receiver (2) is disclosed. A housing (3) houses the indicators (10) and (11) and the photoelectric receiver (2). One indicator (10), formed by a collimating lens (10b) and LED (10a), is mounted adjacent to the photodetector (9) of the photoelectric receiver (2) and transmits visible energy (12) into substantially the same field as the field of view of the photodetector collimating lens (9b). The second indicator (11) is mounted on the rear surface (8) of the photoelectric receiver housing (3), opposite the receiver photodetector (9) and emits visible energy (12) viewable from the end of the photoelectric receiver (2) remote from the transmitter (1). Alignment of the photoelectric transmitter (1) with the photoelectric receiver (2) allows the light (13) from the light source (15) of the photoelectric transmitter (1) to illuminate the receiver photodetector (9), energizing the indicators (10) and (11). The end result are alignment indicting signals that are viewable from both the photoelectric transmitter (1) and the photoelectric receiver (2).

4 Claims, 1 Drawing Sheet

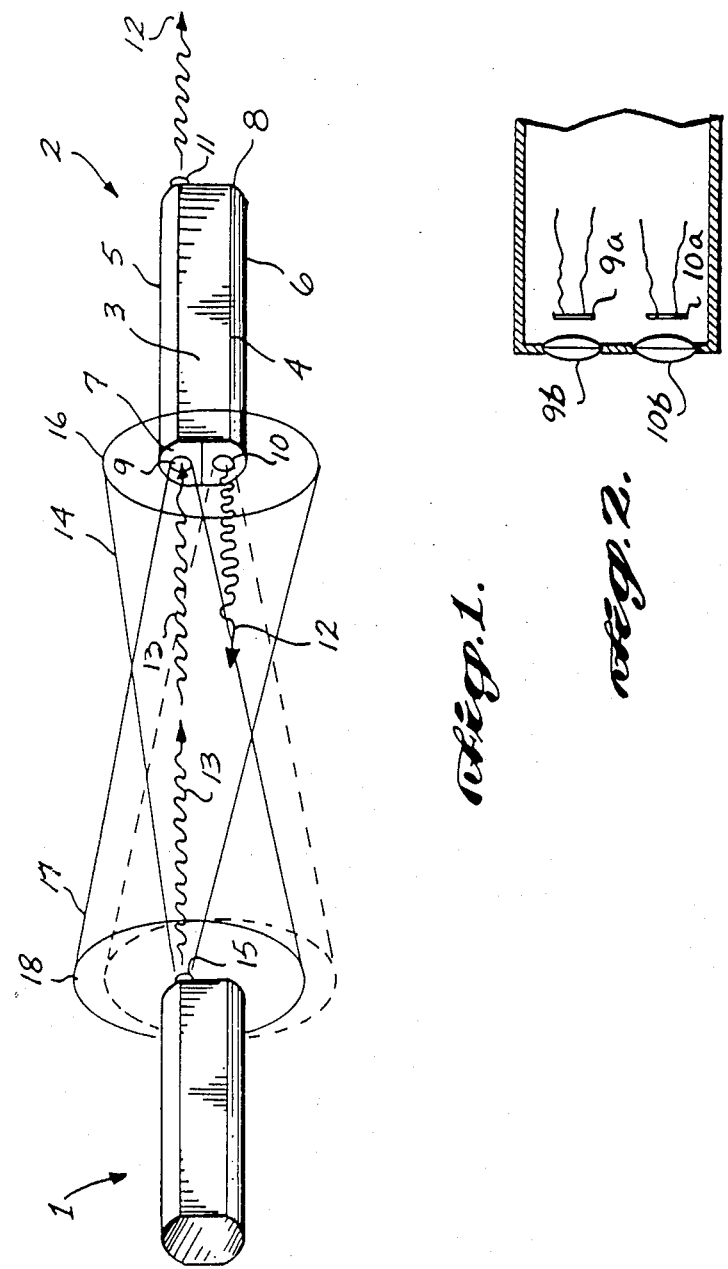

LONG RANGE, THRU-BEAM PHOTOELECTRIC ALIGNMENT INDICATOR

RELATION TO OTHER APPLICATIONS

This application is a continuation-in-part of U.S. patent application Ser. No. 07/095,639 filed Sept. 14, 1987 entitled "Photoelectric Alignment Indicator," now abandoned.

TECHNICAL AREA

This invention is directed to alignment indicators and, more particularly, photosensing system alignment indicators.

BACKGROUND OF THE INVENTION

The use of photosensing systems in industry and other areas to detect the presence or absence of objects has become prevalent in recent years. Photosensing systems include one or more photoelectric transmitters for projecting a beam of light (preferably a beam of modulated light) and one or more associated photoelectric receivers. Photoelectric transmitter and receiver pairs are packaged either together in the same housing or in separate, spaced-apart housings. When a transmitter/receiver pair are packaged in the same housing, a diffuse, specular or retroreflective surface is used to redirect the source light from the transmitter back to the receiver. When the transmitter/receiver pair are spaced-apart, the source light usually impinges directly on the receiver without being redirected after it leaves the transmitter. Spaced-apart transmitter/receiver pairs are commonly referred to in industry, and hereinafter, as thru-beam photosensors. Regardless of the nature of the transmitter/receiver pair, a change in the detection of the light beam creates control signal information that is used to control or communicate with various types of equipment. The change may be the interruption of a transmitter light beam caused by a passing object or the sensing of a transmitter light beam that is normally blocked by the presence of an object. As will be readily appreciated by those skilled in the photosensing art, these are only representative examples of the many uses to which photosensing systems are put.

As will be understood from the foregoing description, one of the requirements of a photosensing system is that the photoelectric transmitter and the photoelectric receiver be aligned such that the light beam produced by the transmitter impinges upon the light sensitive surface of the photoelectric receiver. In the past, thru-beam photosensors have been aligned using the visual feedback created by an indicator light emitting diode (LED) located on the back, top or front of the receiver housing.

When the receiver mounting is adjusted to align the receiver's field of view with the transmitter's light beam, the back and top located indicators are readily visible to the installer or person maintaining the photosensing system. Contrariwise, front located indicators are generally difficult or impossible to see.

When the transmitter mounting is adjusted to align the transmitter's light beam with the receiver's field of view, prior art indicators located on the top and front of the receiver housing are generally visible at separation distances of up to 25 feet. Beyond this distance these indicators cannot be seen. Prior art indicators located on the back of the receiver housing are not visible from the transmitter location. While prior art top and front mounted receiver indicators are not bright enough to be seen at distances greater than about 20 feet, prior art thru-beam photosensors are capable of operating at much larger separation distances (up to 1000'). The reason why top and front mounted receiver indicators are viewable only up to about 20 feet is due to the fact that, in the past, such indicators have been designed to provide wide viewing near the sensor. Thus, while prior receiver indicator designs are suitable for aligning thru-beam sensors in short-range detection environments, they do not satisfy alignment needs in long-range detection environments. In this regard, it should be noted that, frequently, the housings of thru-beam photosensors are commonly one and the same with diffuse proximity and retroreflective housings within a product "familie." This is done to reduce manufacturing costs and to maintain a common aesthetic image.

As a result, in the past, the alignment of long-range, thru-beam photosensors has been cumbersome and expensive when such sensors are used in applications such as remote perimeter security systems and spanning large tanks and conveyors. Methods currently in use include: the temporary connection of an external bright lamp to the sensor output; locating one employee at the transmitter and another at the receiver that work together to align the system; and, having one employee walk back and forth between the transmitter and receiver.

As will be readily appreciated from the foregoing discussion, there is a need to provide a simpler, more efficient way to align the transmitter and receiver of a long-range, thru-beam photosensor system. The present invention is directed to providing a visible alignment indicator designed to simplify the alignment of thru-beam photoelectric transmitter and receiver pairs.

SUMMARY OF THE INVENTION

In accordance with this invention a photoelectric alignment indicator is provided. The photoelectric alignment indicator includes a light emitting device, preferably a light emitting diode (LED) mounted in a photoelectric receiver adjacent to the photodetector of the receiver and positioned behind a collimating lens similar to the collimating lens located in front of the phtotodetector. As a result, the radiation pattern of the indicating LED is substantially the same as the detector field of view. Further, the radiation pattern of the indicating LED is coaxial with detector field of view. This allows a person aligning the transmitter to see the indicating LED at substantially greater distances than the person could see an LED whose beam is not collimated. In a typical long-range, thru-beam photosensor system, this arrangement provides at least 10 and up to 100 times the range of indicator visibility, as viewed from the location of the transmitter. Additionally, implementation of the invention can take advantage of the fact that thru-beam photosensors often use the same housing used for diffuse proximity and retroreflective photosensors in the same product family. Such housings have two collimating lenses, only one of which is needed by the receiver of a long-range photosensor. Thus, such housings already have a collimating lens suitable for use by an alignment indicator formed in accordance with this invention.

In accordance with other aspects of this invention the photoelectric alignment indicator includes a second light emitting device, preferably light emitting diodes (LEDs), mounted on the side of the photoelectric receiver facing away from the transmitter.

As will be readily appreciated from the foregoing summary, the invention provides a photoelectric alignment indicator that simplifies the alignment of thru-beam photoelectric transmitter/receiver pairs, particularly where the photoelectric transmitter and receiver are spaced apart by distances greater than twenty-five feet (25').

BRIEF DESCRIPTION OF THE DRAWINGS

The foregoing and other features and advantages of this invention will become more readily appreciated as the same becomes better understood by reference to the following detailed description when taken in conjunction with the accompanying drawing wherein:

FIG. 1 is a pictorial diagram of a spaced-apart photoelectric transmitter/receiver pair incorporating the invention; and, FIG. 2 is an enlarged, cross-sectional view of the detector end of the receiver of the photoelectric transmitter/receiver pair illustrated in FIG. 1.

DESCRIPTION OF THE PREFERRED EMBODIMENT

FIG. 1 illustrates a photoelectric transmitter 1 and a photoelectric receiver 2 spaced apart from one another. The photoelectric transmitter 1 and photoelectric receiver 2 are oriented such that they form a thru-beam type photosensor system. In order for the invention to be more easily understood, the photoelectric transmitter 1 and photoelectric receiver 2 are shown relatively close to one another. In actual practice, in many instances photoelectric transmitters are spaced substantial distances (50' to 400' or more) from their related photoelectric receivers.

The photoelectric receiver 2 includes a housing 3 that houses the components of the receiver 2. While not forming a part of the invention, the particular housing 3 illustrated in FIG. 1 has a horizontal length greater than its width or height. The sides 4 of the housing 3 are parallel and the top 5 and bottom 6 are convex. The surface of one end of the housing, denoted the front surface 7, is parallel to the surface of the other end, denoted the rear surface 8. Centered in the top half of the front surface 7 of the housing 3 is the photodetector 9 of the photoelectric receiver 2. As is conventional, the photodetector 9 includes a light detecting element 9a mounted behind a collimating lens 9b. See FIG. 2.

Mounted in the housing 3 adjacent to, and below the photodetector 9, centered in the bottom half of the front surface 7 of the encapsulation 3, is an alignment indicator 10. Mounted in the housing 3, on the rear surface 8, is another alignment indicator 11. The front mounted alignment indicator 10 is viewable from the position of the transmitter 1, when the transmitter 1 is aligned with the receiver 2 such that light emitted by the transmitter's light source is received by the photodetector 9 of the receiver 2. The rear mounted alignment indicator 11 is visible from a position on the opposite side of the receiver 2 from the transmitter 1. The alignment indicators 10 and 11 are preferably light emitting diodes (LEDs) that emit visible energy 12 when alignment occurs, i.e., when the light emitted by the transmitter is received by the photodetector 9 of the receiver 2, as next described.

The photoelectric transmitter 1 includes a light source 15, preferably formed by a LED, and lens combination that radiates collimated light beam 13. While the light beam is generally collimated, it diverges slightly and, thus, has a somewhat conical pattern 14. The light source 15 approximates a point source that defines the apex of the cone. The long axis of the cone lies parallel to the longitudinal axis of the transmitter 1. The cross section of this conical pattern 14 at the receiver 2 defines the photoelectric transmitter's field of radiation 16 at the receiver.

The photodetector 9 of the photoelectric receiver 2 has a collimated field of view that also diverges slightly and, thus, has a somewhat conical pattern 17 with an apex located at the photodetector 9. The long axis of the cone lies parallel to the longitudinal axis of the receiver 2. The cross section of this conical pattern 17 at the transmitter 1 defines the photoelectric receiver's field of view 18 at the transmitter.

Alignment occurs when the photodetector 9 of the photoelectric receiver 2 lies within the conical pattern 14 of the light source 15 of the photoelectric transmitter 1 and the light source 15 lies within the conical pattern 17 of the photodetector's field of view. In this relative position, the photodetector 9 will detect the light 13 emitted by the light source 15. The circuitry (not shown) of the photoelectric receiver 2 will respond to the detected light 13 and produce an electrical output signal. The electrical output signal will energize the front and rear mounted indicators 10 and 11 causing them to emit visible energy 12. The strength of the detected light 13 varies within the phototransmitters field of radiation 16 and is the strongest at the center of the field.

In accordance with the invention, as illustrated in FIG. 2, the front mounted indicator 10 comprises a suitable light source, such as a light emitting diode (LED) 10a, located behind a collimating lens 10b. Preferably, the front indicator collimating lens 10b has the same optical size and characteristics as the photodetector collimating lens 9b. Thus, as shown by dashed lines in FIG. 1, the radiation pattern of the front mounted indicator 10 is substantially the same as the field of view of the photodetector 9. The use of a collimating lens, that emits indicating light in a pattern that is substantially coaxial with the light detection field of view allows the phototransmitter 1 and photoelectric receiver 2 to be spaced apart by substantial distances (up to at least 400'). Thus a person aligning a transmitter at a distance, such as 100 feet, away from a receiver with a front mounted indicator formed in accordance with the invention can readily observe the light emitted by the indicator. Light emitted by an LED mounted atop the receiver housing, for example, cannot be observed at such a distance without the aid of an optical magnifying device, i.e., a telescope. In this regard, it should be noted that for at least fifteen (15) years photoelectric housings have been tooled for a dual lens so that the common housings can be used in both retroreflective systems wherein the light source and photodetector are mounted in the same housing and thru-beam systems wherein the light source and photodetector are mounted in different housings. In past thru-beam systems the second lens has been unused, or used with a second detector to boost sensing range. The present invention allows the second lens to be used to solve a long range indicator visibility problem that has long plagued the photoelectric sensor industry.

As will be readily appreciated from the foregoing description, the invention provides a new and improved alignment indicating device that is ideally suited for use in photosensing systems to assist in aligning the photoelectric transmitters and photoelectric receievers of such systems. While a preferred embodiment of the invention has been described it will be appreciated that, within the scope of the appended claims, the invention can be practiced otherwise than as described herein. For example, the invention can be used with other types of transmitter and receiver housings. Also, various light detecting devices, such as photodiodes and phototransistors, and light emitting elements other than LEDs can be used, if desired. Or, if desired, the optically enhanced front mounted indicator can be used alone.

The embodiments of the invention in which an exclusive property or privilege is claimed are defined as follows:

1. In an industrial photoelectric receiver for use in photosensing systems to detect light emitted by a photoelectric transmitter when said photoelectric transmitter and photoelectric receiver are aligned with one another in a predetermined manner, said photoelectric receiver including a housing and a light detecting means mounted in the housing, the improvement comprising an alignment indicator, said alignment indicator including an indicator mounted in said receiver housing and emitting visible light from the side of said receiver housing facing said transmitter when said receiver is aligned with a transmitter such that the light emitted by a light source mounted in said transmitter is detected by said light detecting means mounted in said receiver housing, said indicator including a collimating lens located in said side of said receiver facing said transmitter and a light emitting element mounted in said housing behind said collimating lens such that light emitted by said light emitting element passes through said collimating lens.

2. The improvement claimed in claim 1, wherein said light detecting means of said photoelectric receiver includes a collimating lens mounted in said side of said receiver facing said transmitter and a light detecting element mounted in said housing behind said collimating lens for receiving light passing through said collimating lens, the lens collimated radiation field of said indicator being substantially the same as the lens collimated field of view of said light detecting means.

3. The improvement claimed in claim 2 including a second indicator mounted in said receiver housing and emitting visible light from the side of said receiver housing facing away from said transmitter housing when said receiver is aligned with said transmitter such that light emitted by a light source mounted in said transmitter housing is detected by said light detecting means mounted in said receiver housing.

4. The improvement claimed in claim 1 including a second indicator mounted in said receiver housing and emitting visible light from the side of said receiver housing facing away from said transmitter housing when said receiver is aligned with said transmitter such that light emitted by a light source mounted in said transmitter housing is detected by said light detecting means mounted in said receiver housing.

* * * * *